May 7, 1963 K. MOHR 3,089,113
ROTARY ELECTRIC CABLE COUPLING
Filed June 6, 1960 3 Sheets-Sheet 1

Inventor:
KARL MOHR
By Hame and Nydick
ATTORNEYS

May 7, 1963　　　　　K. MOHR　　　　3,089,113
ROTARY ELECTRIC CABLE COUPLING
Filed June 6, 1960　　　　　　　　　　3 Sheets-Sheet 2

Inventor:
KARL MOHR
By Hane and Nydick
ATTORNEYS

United States Patent Office 3,089,113
Patented May 7, 1963

3,089,113
ROTARY ELECTRIC CABLE COUPLING
Karl Mohr, Aschaffenburg (Main), Germany, assignor to Ultra-Prazisionswerk G.m.b.H., Aschaffenburg (Main), Germany, a firm
Filed June 6, 1960, Ser. No. 34,083
5 Claims. (Cl. 339—8)

This invention relates to an electric cable coupling of the type which consists of mutually concentric and relatively turnable units with current transmission members provided therein.

Electric cable couplings of the said kind are known, but they are possessed of certain disadvantages, and in one of its particular aspects the invention is directed to the removal of these disadvantages and to provide a coupling for the connection of electric cables and the like which will permit of any number of turns between the individual units but will nevertheless have a practically unlimited duration of life with hardly any intermediate resistance.

Apart from the removal, as aforesaid, of existing disadvantages, another feature of the invention consists in the arrangement within an electric cable coupling of currentless as well as of current conductive mechanical bearings intermediate the individually turning units, of which the current conductive bearings may be made resilient in any known or convenient manner, while it is another feature of the invention to provide yieldingly turnable antifriction members to serve as current transmission parts and to arrange them so as to render them free from the mechanical strains of the turnable bearings.

In accordance with the invention the individually turnable units may be made of insulating material with their internal parts being in the shape of a radially subdivided tube. The parts of the coupling upon which the resiliently arranged contact members are carried, may be repeatedly subdivided so that the construction of the coupling may in each case be suited to the respective number of cable strands which are to be connected by the coupling.

In a known coupling of the aforesaid type antifriction members, such as balls or rollers, are used to maintain the electric contact between the individually turntable units. They are subjected to the influence of a spring which is common to all units and which, at the same time, carries out the function of a revoluble bearing. Owing to this arrangement, particularly in cases of high speeds or long durations of rotation, the coupling units are subjected to excessive wear particularly under the influence of mechanical strains which often give rise to high transition resistances.

This is especially true of cable couplings for the leads of electrical apparatus in which the cable ends are turnable in cable connecting direction and in which, at the place of current transition between the cable and the coupling, each strand of the cable end is electrically connected with its pertaining contact member over intermediately connected antifriction members and in full contact with the said contact member under the influence of auxiliary forces.

The accompanying drawings illustrate several embodiments of the invention by way of example, it being understood, that any alterations or deviations from the arrangements shown may be resorted to in order to suit convenience or requirements. In these drawings.

Figure 1:
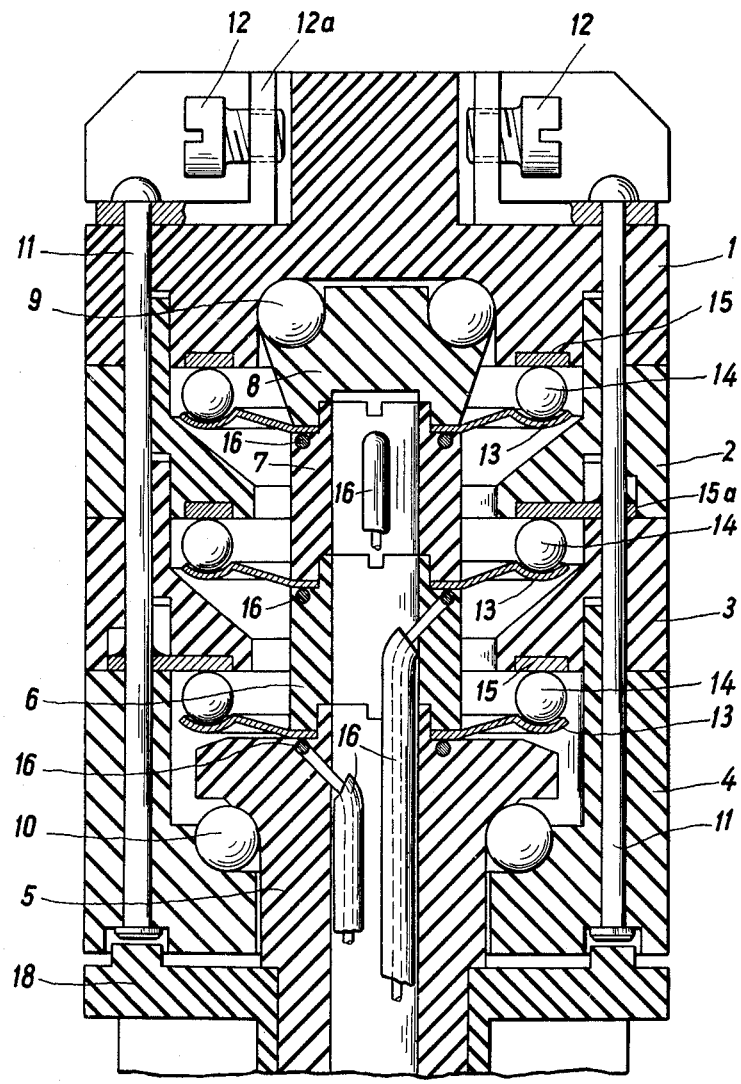
FIG. 1 represents a vertical section through one embodiment of an electric cable coupling in accordance with the invention.

In the embodiment illustrated in FIG. 1, the various units of the cable coupling, of which there may be any practical number, are shown to consist each of an external preferably annular casing which is turnable in relation to an internally arranged tube section. Both the casing and the tube section are made of insulating material. The external casings are designated by the references 1, 2, 3 and 4, and the internal tube sections by the numbers 5, 6, 7 and 8.

Arranged between the said inner and outer members are currentless bearings 9 and 10, as also current conductive bearings 13, 14 and 15, of which the bearings 9 and 10 are of the anti-friction type, such as ball or roller bearings, and serves as mechanical bearings between the parts 1 and 8 of the coupling, while the current conductive bearings consist of dished plate springs 13 supporting balls or rollers 14, and of the plate rings or washers 15, of which the plate springs 13 are electrically connected to the individual line contacts 16.

The units 1, 2, 3 and 4 are joined to each other by means of stay bolts 11, to which the plate rings 15 are connected as by upturned prongs or the like 15a. The bolts 11 are electrically connected to binding screws 12 over angular terminal pieces 12a.

Pushed onto the lower tube section 5 is a sleeve of insulating material 18 having contacts (not shown) which are connected to the conductors 16. As will be seen from the drawing, any mechanical strains of the assembly are taken up by the ball or rollers bearings 9 and 10 serving as thrust bearings, so that the resilient current conductive bearings 13, 14 and 15 are fully relieved from stress also in the case of high speed or continuous rotation couplings.

Figure 3:
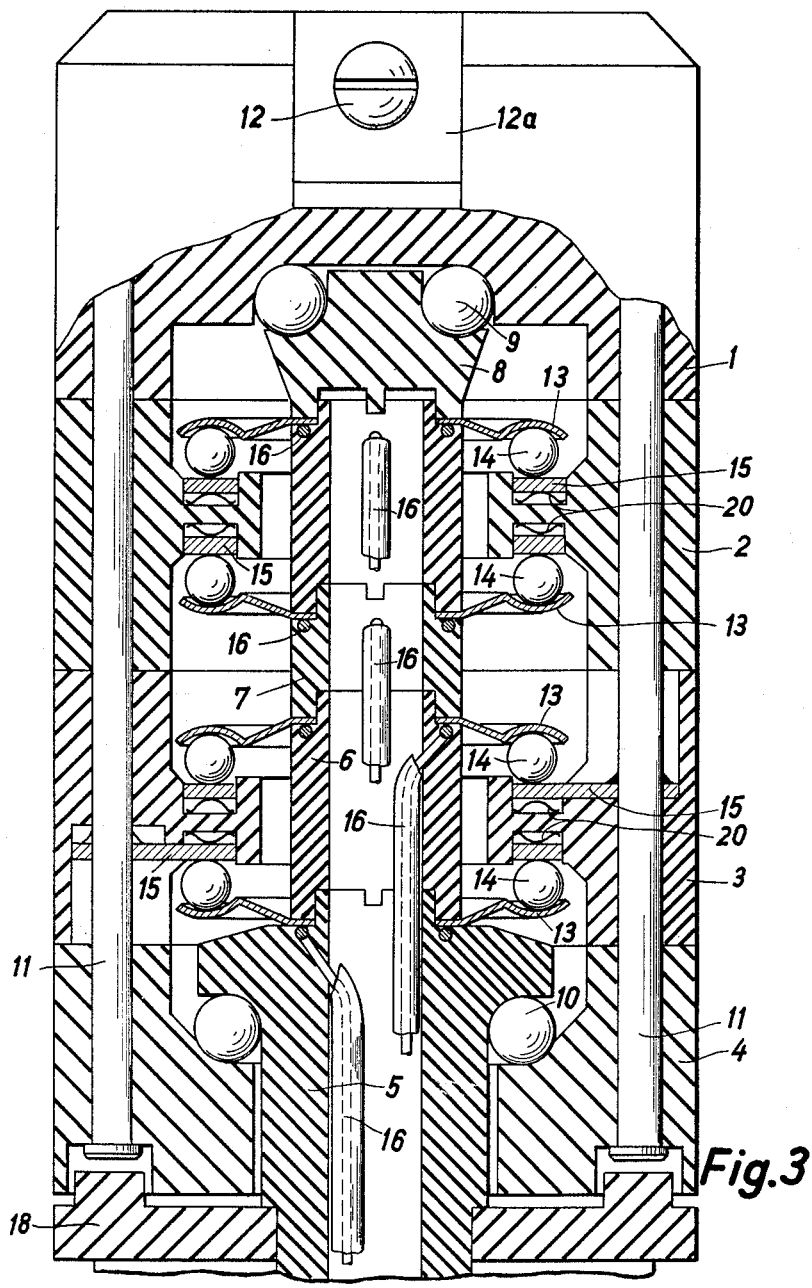
FIG. 3 is a similar sectional view through a modified form of the coupling such as may be used for electric high speed couplings.

The modification shown in FIG. 3 is particularly intended for high speed couplings. The arrangement is largely similar to the device shown in FIG. 1 with the difference, however, that the rings 15 of the outer members 2 and 3 are made to rest on preferably corrugated springs 20 for the purpose of a more intimate contact between the parts, while for the sake of space saving each neighboring pairs of plate springs 13 together with their contact rings 15 are mounted in a mirror reflection-like arrangement.

Figure 2:
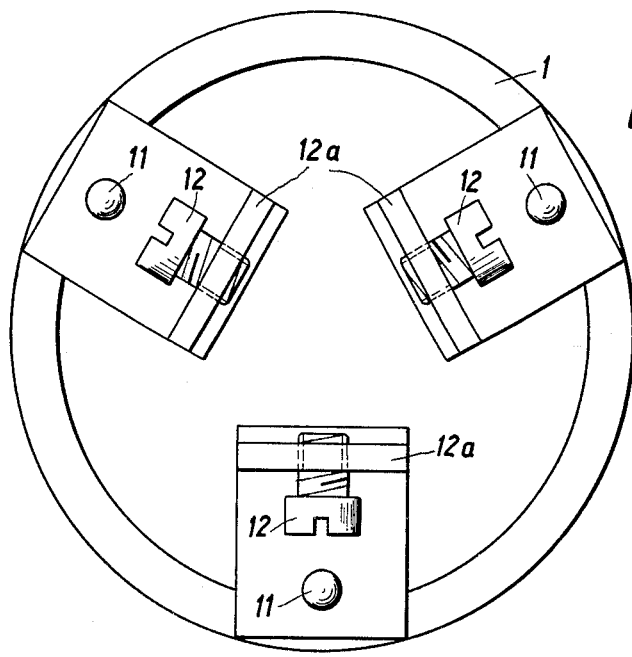
FIG. 2 is a top view of FIG. 1 showing the terminals.
Figure 4:
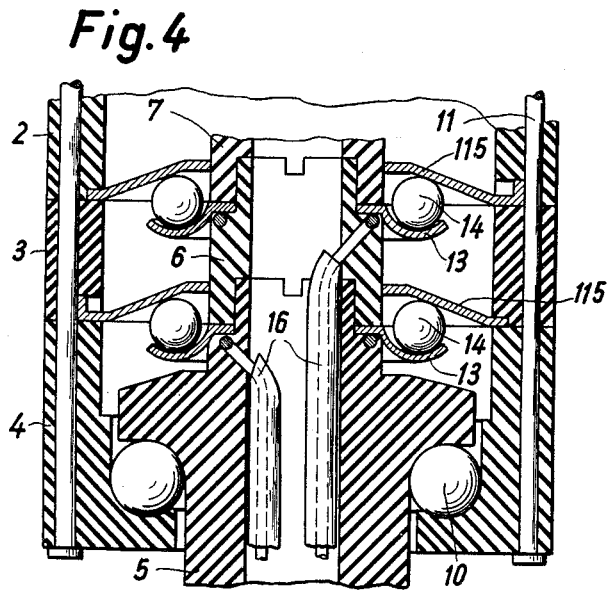
FIG. 4 shows a detail of a modified form of the coupling, also in section.

FIG. 4 indicates how the rings 115, which correspond to the rings 15 of the external casings in FIGS. 1 and 2, may be made resilient in the shape of plate springs for instance. This produces a more gentle yielding action which has proved particularly suitable in the case of low voltage connections.

What I claim is:

1. An antifriction cable coupling for connecting two relatively revolving multiple lead members, said coupling comprising an outer and an inner substantially cylindrical member consisting of dielectric material and arranged concentrically one within the other radially spaced apart to define an annular chamber therebetween; two antifriction bearings of the deep-groove ball race type adapted to sustain high radially and axially directed loads, said bearings being disposed between said cylindrical members one at each end of said chamber; a plurality of current transmitting means, corresponding in number to the number of leads of said member to be connected by said coupling, said current transmitting means being disposed in the chamber intermediate said antifriction bearings, each of said current transmitting means comprising a first and a second annular contact element, the first contact element being mounted on said outer cylindrical member and the second contact element being mounted on said inner cylindrical member, at least one of said contact elements being formed of resilient conductive material; and a plurality of antifriction current conductors disposed between each pair of said contact elements and urged into rolling contact engagement with the respective contact elements due to the resiliency of said one contact element.

2. An antifriction cable coupling according to claim 1, in which said first and second contact elements are annular disc-like contact elements, both contact elements being made of resilient conductive material having concave rim portions formed therein and facing each other; and a plurality of metal balls for transmitting current disposed between said first and said second resilient contact element thereby urging said balls into rolling engagement with said contact elements.

3. An antifriction cable coupling for connecting two relatively revolving multiple lead members, said coupling comprising an outer and an inner substantially cylindrical member consisting of dielectric material and arranged concentrically one within the other radially spaced apart to define an annular chamber therebetween; said outer and said inner member being formed by coaxially interengaging sections; two antifriction bearings of the deep-groove ball race type and being adapted to sustain high radially and axially directed loads, said bearings being disposed between said cylindrical members one at each end of said chamber, the end sections of said inner and said outer member forming races of said antifriction bearings; a plurality of current transmitting means corresponding in number to the number of leads of said members to be connected by said coupling, said current transmitting means being disposed within said chamber intermediate said antifriction bearings, each of said current transmitting means comprising a first and a second annular disc-like contact element, said first contact element having a plane radial contact surface and being mounted on said outer cylindrical member and said second contact element being mounted on said inner cylindrical member and being made of resilient material having a concave annular contact surface formed in its rim portion facing said first contact element; and a plurality of metal balls disposed between each pair of said contact elements within the annular contact surface of said second resilient contact element, thereby urging said balls into rolling contact engagement with said first contact element.

4. An antifriction cable coupling according to claim 3, in which spring means urge said first contact element in axial direction toward said second resilient contact element.

5. An antifriction cable coupling according to claim 3, in which said coaxially interengaging sections forming said outer member are held together by radially spaced stay bolts having on one end a head engaging said one end of said outer member and having on the other end a head engaging terminal means arranged on the other end of said outer member, the number of said stay bolts corresponding to the number of cable leads, each of said stay bolts being connected with one of said first contact members, thereby forming a conductor to said terminal means.

References Cited in the file of this patent

UNITED STATES PATENTS

| | | |
|---|---|---|
| 2,064,585 | Antienza | Dec. 15, 1936 |
| 2,224,343 | Grimaldi | Dec. 10, 1940 |
| 2,319,443 | Corte | May 18, 1943 |
| 2,474,070 | Sokolik | June 21, 1949 |
| 2,523,081 | Wendt | Sept. 19, 1950 |
| 2,726,371 | Seeloff | Dec. 6, 1955 |

FOREIGN PATENTS

| | | |
|---|---|---|
| 735,594 | France | Aug. 30, 1932 |
| 961,224 | France | Nov. 14, 1949 |
| 607,438 | Great Britain | Aug. 31, 1948 |